United States Patent [19]

Haraden et al.

[11] Patent Number: 4,973,881
[45] Date of Patent: Nov. 27, 1990

[54] AUTOMATIC SHUT-OFF DEVICE FOR AN ELECTRIC LAMP

[75] Inventors: Thomas Haraden, Ipswich; Harold L. Hough, Beverly, both of Mass.

[73] Assignee: GTE Products Corporation, Danvers, Mass.

[21] Appl. No.: 450,875

[22] Filed: Dec. 14, 1989

[51] Int. Cl.[5] .................... H01J 7/44; H01J 17/34
[52] U.S. Cl. ...................... 315/73; 315/74; 315/119
[58] Field of Search .............. 315/73, 74, 119, 25; 362/21

[56] References Cited

U.S. PATENT DOCUMENTS

| | | | |
|---|---|---|---|
| 2,955,195 | 8/1958 | Guild | 362/21 |
| 4,013,920 | 3/1977 | Petro | 315/74 |
| 4,032,816 | 6/1977 | Rokosz | 315/73 |
| 4,039,893 | 8/1977 | Corbley . | |
| 4,156,830 | 5/1979 | Strauss . | |
| 4,186,327 | 1/1980 | Petro . | |
| 4,217,522 | 8/1980 | Strauss | 315/74 |
| 4,221,993 | 9/1980 | Phillipp . | |
| 4,229,678 | 10/1980 | Petro | 315/74 |
| 4,417,177 | 11/1983 | Damiano . | |
| 4,481,446 | 11/1984 | Tsuchihashi et al. | 315/73 |
| 4,647,809 | 3/1987 | Blaisdell . | |
| 4,752,718 | 6/1988 | Strauss et al. | 315/74 |

Primary Examiner—Eugene R. Laroche
Assistant Examiner—Son Dinh
Attorney, Agent, or Firm—Joseph S. Romanow

[57] ABSTRACT

An electric lamp is provided having an outer envelope or jacket with a lamp base attached thereto, the lamp base having an aperture extending therethrough. A sealed inner capsule is supported within the outer envelope and electrically connected to the lamp base and to an electrically conductive elongated member one end of which engages an inner wall of the outer envelope and an opposite end of which extends through the aperture in the lamp base. A spring is provided which urges the one end of the elongated member against the inner wall and which will urge the opposite end of the elongated member out of the aperture if the envelope is broken thereby disconnecting voltage to a lead of the inner capsule.

20 Claims, 1 Drawing Sheet

AUTOMATIC SHUT-OFF DEVICE FOR AN ELECTRIC LAMP

BACKGROUND OF THE INVENTION

1. Field of the Invention

The present invention relates to an electric lamp of the type having a light-source capsule within an outer envelope or jacket and including a mechanical, spring-triggered elongated member which disconnects voltage to one lead of the capsule when the outer envelope or jacket is broken.

2. Description of the Prior Art

Electric lamps of the type having a light-source capsule within an outer envelope or jacket are well known in the art. For example, two commonly known electric lamps of this nature are those referred to as high intensity discharge (HID) lamps and those referred to as tungsten-halogen lamps. The present invention finds particular usefulness in the latter; that is, in tungsten-halogen lamps where a tungsten-halogen capsule is mounted within an outer jacket or envelope. One significant difference between the two is that in a conventional high intensity discharge lamp the inner envelope commonly referred to as an arc tube and the outer envelope or jacket are each hermetically sealed. By way of contrast, in a tungsten-halogen lamp, although the inner tungsten-halogen capsule is sealed the outer jacket is not. Notwithstanding this difference, each lamp shares a common problem which is the undesirable exposure of the inner arc tube or capsule should the outer jacket be broken. Any failure of the integrity of the outer envelope will comprise the safety features performed by the outer envelope. For example, in lamps of the type of the present invention if the outer jacket is damaged, the inner capsule might continue to light. Due to the high temperature and high pressure of the inner capsule the possibility that such inner capsule might shatter presents a continuing concern. The shattering of the inner capsule can cause a release of hot particles into the atmosphere which will create a risk of personal injury and property damage. It is therefore desirable to provide some means for disabling or disconnecting the power to the lamp upon sensing of such a failure in the outer envelope.

Although the present invention relates to those lamps wherein the outer envelope is not sealed, it is insightful to review the known safety features applied to the sealed outer jackets of high intensity discharge lamps, some of the concerns associated with sealed and non-sealed outer jackets being the same. In U.S. Pat. No. 4,032,816 to Rokosz, which issued on June 28, 1977, a spring loaded safety switch is connected in series with one of the electrodes of the inner bulb. Under normal operating conditions, the switch is held closed by the outer glass envelope. Breakage of the envelope will allow the switch to open and de-energize the lamp. This particular switch is mounted near the top electrode farthest from the lamp base.

In U.S. Pat. No. 4,039,893 to Corbley, which issued on Aug. 2, 1977, a mechanical disconnect switch is installed in the circuit for the upper electrode, but the switch is mounted near the bulb base and held in a closed, operative position by the contact of the upper inner lamp support with the inside of the top of the outer envelope. A spring associated with the switch will force the switch contacts apart upon breakage of the outer envelope. There will be subsequent loss of support for the upper inner lamp support.

A simple leaf spring switch protects the HID lamp in U.S. Pat. No. 4,229,678 to Petro, which issued on Oct. 21, 1980. This switch is mounted at the top of the lamp opposite the base, and is held closed by contact of one leaf with the inside of the outer envelope. Thus, breakage of the envelope will allow the switch to open and de-energize the lamp.

A similar leaf spring switch is provided in U.S. Pat. No. 4,217,522 to Strauss, which issued on Aug. 12, 1980. In a first embodiment, the spring leaves are mounted near the top of the lamp and engage the inside surface of the outer envelope just as in the Petro patent described above. A second embodiment discloses a compound curve in one of the spring leaves and a slightly different mounting arrangement.

Yet another leaf spring design is provided in U.S. Pat. No. 4,221,993 to Phillipp et al, which issued on Sept. 9, 1980. This design includes a single leaf spring switch in which the leaf is formed into a loop with both ends secured at a single mounting point, which point is also part of the supply circuit for the upper electrode of the arc tube. Under normal operating conditions, one side of the single leaf is pressed into contact with the contact button for the upper electrode by pressure generated on the other side of the leaf where it presses against the inside of the outer envelope. Consequently, breakage of the outer envelope releases the pressure, and the spring disconnects the upper electrode at its contact button.

U.S. Pat. Nos. 4,156,830 and 4,752,718 to Strauss et al, which issued on May 29, 1979 and June 21, 1988, respectively, offer further refinements of the leaf spring switch by including contact buttons on each leaf. These patents also offer another embodiment which is a recent refinement of a basic fuse safety device, in which a small filament is provided within the outer envelope, which filament will oxidize and burn out upon breakage of the envelope and exposure to the atmosphere.

Yet another embodiment of the resilient leaf spring switch is shown in U.S. Pat. No. 4,013,920 to Petro, which issued on Mar. 22, 1977. As in other switches of this type, the switch is held closed by contact of one of the leaves with the inside of the outer glass envelope. Breakage of the envelope, allows the switch contacts to separate, disconnecting the arc tube from its source of power.

In U.S. Pat. No. 4,186,327 to Petro, which issued on Jan. 29, 1980, a different type of switch is provided in the form of a thin, fragile, striplike conductor which forms part of the electrode circuitry for the arc tube. This fragile conductor is secured to the inner wall of the outer glass envelope, where it will be destroyed or broken when the envelope is broken, thus deenergizing the lamp.

In U.S. Pat. No. 4,417,177 to Laxiano, which issued on Nov. 22, 1983, a safety switch is disclosed which is specifically adapted to high intensity discharge lamps in which a vacuum is drawn within the outerglass envelope. The switch means, mounted in the base of the bulb, will remain in a closed, operative position as long as the vacuum within the outer envelope remains intact. Loss of the vacuum, as by breakage of the envelope, will release a spring biased switch activator which will open the switch and disconnect the lamp.

The present invention represents an effort to provide a spring biased automatic mechanical safety switch for electric lamps wherein the outer envelopes is not hermetically sealed. In contrast to the foregoing prior art, such switch extends out of the outer envelope and through the base, and is moveable relative thereto as described therein.

SUMMARY OF INVENTION

This invention achieves these and other results by providing an electric lamp which comprises a sealed inner envelope means for converting electrical energy into light and having a first inner envelope lead, and a second inner envelope lead, extending therefrom. A wire support frame is also provided. The first inner envelope lead is electrically connected to the wire support frame and the second inner envelope lead is spaced from the wire support frame. An elongated member is provided having an electrically conductive end portion and an opposite end portion. A diode is provided having a first diode lead electrically connected to the electrically conductive end portion and a second diode lead electrically connected to the second inner envelope lead. A light-transmissive outer envelope is provided forming a cavity therein and having a neck portion and an opposite dome portion. The wire support frame has one end adjacent to the neck portion and an opposite end extending into the cavity to support the sealed inner envelope means within the cavity. A lamp base is provided having an electrically conductive first region connected electrically to the wire support frame and an electrically conductive second region insulated from the first region, the first region being attached to the neck portion of the outer envelope and the second region having an aperture therethrough. The electrically conductive end portion of the elongated member extends through the aperture. A spring means engages the elongated member for urging the opposite end portion of the elongated member into engagement with an inner wall of the opposite dome portion of the outer envelope and for urging the electrically conductive end portion out of the aperture if the outer envelope is broken.

DESCRIPTION OF THE PREFERRED EMBODIMENT

Figure 1:
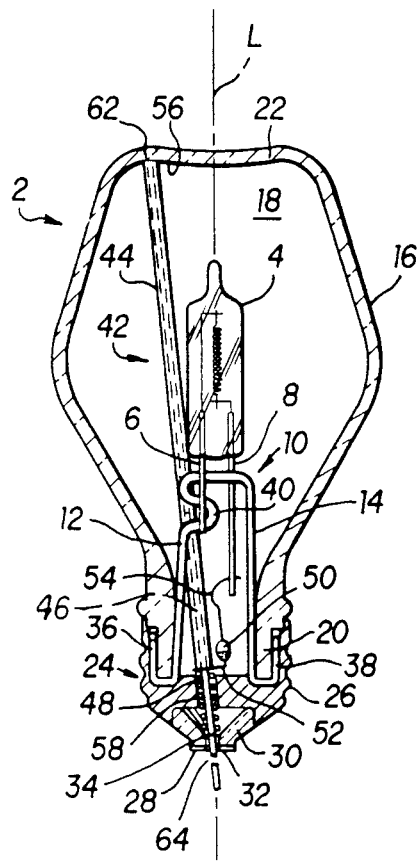
FIG. 1 is a sectional view of one embodiment of the present invention.
Figure 2:
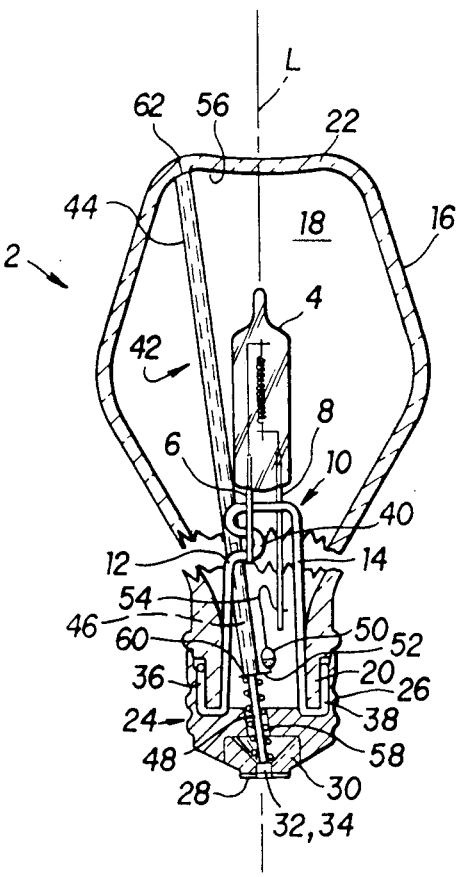
FIG. 2 is a sectional view of the embodiment of FIG. 1, showing the outer envelope in a broken condition.

The embodiment of this invention which is illustrated in FIGS. 1 and 2 is particularly suited for achieving the objects of this invention. FIGS. 1 and 2 depict an electric lamp which includes a sealed inner envelope means for converting electrical energy into light. In the embodiment of FIGS. 1 and 2, the electric lamp is, without limitation, a tungsten-halogen lamp 2 having a longitudinal axis L, and the sealed inner envelope means is a conventional tungsten-halogen incandescent capsule 4. Such inner envelope means includes a first inner envelope or capsule lead 6 and a second inner envelope or capsule lead 8 each of which extend from the tungsten-halogen capsule 4. As depicted in the drawings a tungsten filament extends in capsule 4 between the internal terminations of the leads 6 and 8.

The lamp 2 is provided with a wire support frame 10. The inner envelope lead 6 is electrically connected to wire support frame 10. The inner envelope lead 8 is spaced from the wire support frame 10. In the preferred embodiment, wire support frame 10 includes a first leg 12 and a second leg 14, lead 6 being electrically connected and structurally connected to the first leg 12 as, for example, by being welded thereto.

Lamp 2 also includes a light-transmissive outer envelope 16 forming a cavity 18 therein and having a neck portion 20 and an opposite dome portion 22. A lamp base 24 is connected to the neck portion 20 of the outer envelope 16. In particular, lamp base 24 includes an electrically conductive first region and an electrically conductive second region insulated therefrom. In the preferred embodiment, as depicted in FIGS. 1 and 2, the electrically conductive first region includes a conventional threaded metal shell 26 and the electrically conductive second region includes a metal eyelet 28. An insulating means such as a glass insulator 30 is provided between the metal shell 26 and the metal eyelet 28. An aperture 32 extends through the metal eyelet 28 and an aperture 34 extends through the insulator 30 to provide access into the lamp base 24 and outer envelope 16.

Wire support frame 10 is electrically coupled to the electrically conductive first region of the lamp base 24 in such a manner that the wire support frame has one end adjacent the neck portion 20 of the outer envelope 16 and an opposite end extending into the cavity 18 to support the tungsten-halogen capsule 4 within the cavity. In particular, one end of the wire support frame is interposed relative to the neck portion 20 and the electrically conductive first region of the lamp base 24 and is attached to the neck region. For example, as depicted in FIGS. 1 and 2, the first leg 12 and second leg 14 of the wire support frame each have a respective end segment 36 and 38 which is attached to the neck portion 20 and is electrically connected to the threaded metal shell 26. End segments 36 and 38 can be, for example, of the "clamp-on" type or the "slide on" type as fully described in U.S. Pat. No. 4,647,809 to Blaisdell et al and assigned to the assignee of the present invention. Legs 12 and 14 also have an opposite end segment 40 which extends into the cavity 18 to support the sealed tungsten-halogen capsule 4 within the cavity. End segments 36 and 38 are interposed relative to the neck portion 20 and the threaded metal shell 26 which is attached to the neck portion in a conventional manner. For example, base 24 can be a "push-on" type or a "screw-on" type as fully described in the '809 patent to Blaisdell et al. Base 24, when mounted, reinforces the mounting means for the wire support frame 10.

An elongated member 42 having an electrically conductive end portion and an opposite end portion is also provided. The function of such elongated member is to disconnect voltage to one lead of the tungsten-halogen capsule, when the outer envelope 16 is broken, as described hereinafter. In the preferred embodiment, the elongated member 42 comprises an outer glass tube 44 and a concentric inner metal rod 46. A length 48 of the inner metal rod 46 extends in an axial direction out of the outer glass tube 44 to form the electrically conductive end portion. In this embodiment the outer glass tube 44 forms the opposite end portion of the elongated member 42. It will be apparent that the outer glass tube 44 can be dispensed with. In such an embodiment, the metal rod will form the entire elongated member 42. However, it is believed that use of the outer glass tube and inner concentric metal rod will reduce shadows and provide better insulative value when the lamp is in use. In the embodiment of FIGS. 1 and 2 the inner metal rod 46 is nickel or any other suitable electrically conductive material. The electrically conductive end portion identified by length 48 extends through the apertures 32 and 34 which extend through the eyelet 28 and insulator 30, respectively, and is electrically connected, but not mechanically connected, to the metal eyelet 28 which forms the electrically conductive second region of the lamp base 24. In the preferred embodiment, a segment of length 48 extends through apertures 32 and 34 as depicted in FIG. 1.

Although not required, the tungsten-halogen lamp depicted in FIGS. 1 and 2 includes a conventional diode 50. Diode 50 includes a first diode lead 52 and a second diode lead 54. Diode lead 52 is electrically and mechanically connected as, for example, by welding to the length 48 which forms the electrically conductive end portion of the elongated member 42. Diode lead 54 is in the form of a conventional fuse wire and is electrically connected as, for example, by welding to the inner envelope lead 8.

A spring means is provided for urging the member 42 into engagement with an inner wall 56 of the dome portion 22 of the outer envelope 16 and for urging the electrically conductive end portion of the elongated member out of the apertures 32 and 34 if the outer envelope is broken. In the preferred embodiment, such spring means is a helical spring 58 which is concentric about the length 48 of the inner metal rod 46. Helical spring 58 is compressed between the elongated member 42 and the lamp base 24 to urge the outer glass tube 44 against the inner wall 56. To this end, the outer glass tube 44 provides a shoulder 60 where the length 48 of the inner metal rod 46 extends from the outer glass tube and the diode lead 52 is electrically connected and mechanically connected to the length 48 of the inner metal rod 46 adjacent shoulder 60. Helical spring 58 has a first end which abuts diode lead 52 and an opposite end which abuts the lamp base at the insulator 30.

The electric lamp described herein provides a mechanical, spring triggered assembly which automatically disconnects voltage to one lead of the inner envelope or capsule when the outer envelope is broken. Referring to FIG. 1, in assembling the tungsten-halogen lamp 2, the various components described herein are positioned within the outer envelope 16 and the lamp base 24 is attached to the neck portion 20 by, for example, screwing the threaded metal shell 26 to the neck portion allowing the metal rod 46 to extend through the apertures 32 and 34 and the helical spring 58 to compress between diode lead 52 and the insulator 30 of the base. In this manner, the outer glass tube 44 is caused to exert pressure on the inner wall 56 of the outer envelope 16 at the end 62 of the outer glass tube 44. Metal rod 46 is then cut as at 64 to leave a small portion extending from the eyelet 28. Allowing a small portion of the metal rod to extend from the lamp base at the eyelet provides a means to custom-fit each lamp to accommodate the tolerance of the particular application. The metal rod 46, is not soldered to the eyelet 28.

In this embodiment, the electrical contact between end segments 36 and 38 with the threaded metal shell 26 forms a redundant electrical contact for one pole of an electrical circuit. Electrical power from an external source such as a socket the lamp is screwed into (not shown) will be transmitted to the tungsten-halogen capsule 4 through the wire support frame 10 which is electrically connected to the lead 6. The circuit is completed by electrically connecting lead 8 to the diode 50 which is electrically connected to the electrically conductive length 48 of the metal rod 46 which is electrically insulated from the threaded metal shell by the insulator 30. In this manner, whether or not the length 48 of the metal rod 46 contacts the metal eyelet 28, the length 48 will be electrically connected to the center or hot tap of the socket.

When the outer bulb fractures as depicted in FIG. 2, the helical spring 48 is able to extend as it decompresses. Such extension of the spring pushes the outer glass tube 44 in a direction away from the lamp base 24 as a result of the engagement of the helical spring with the diode lead 52 which is adjacent shoulder 60 of the outer glass tube. Diode 50 and the metal rod are also pushed away from the lamp base 46. In this manner, the segment of the length 48 of the metal rod 46 which extends through the apertures 32 and 34 is urged out of the apertures and drawn inside the base. Such movement of the metal rod 46 breaks electrical contact with the center or hot tap of the socket of the lamp to extinguish the inner capsule 4. Such extinguishing occurs regardless of the position of the electric lamp 2.

The electric lamp as described herein provides a springbiased automatic mechanical safety switch for an electric lamp such as, for example, a tungsten-halogen lamp wherein the outer envelope or jacket is not hermetically sealed and wherein the switch mechanism extends out of the outer envelope and through the base, and is moveable relative thereto.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:
1. An electric lamp, comprising:
a sealed inner envelope means for converting electrical energy into light and having a first inner envelope lead, and a second inner envelope lead, extending therefrom;
a wire support frame, said first inner envelope lead being electrically connected to said wire support frame and said second inner envelope lead being spaced from said wire support frame;
an elongated member having an electrically conductive end portion, and an opposite end portion;
a diode having a first diode lead electrically connected to said electrically conductive end portion and a second diode lead electrically connected to said second inner envelope lead;
a light-transmissive outer envelope forming a cavity therein and having a neck portion and an opposite dome portion, said wire support frame having one end adjacent said neck portion and an opposite end extending into said cavity to support said sealed inner envelope means within said cavity;
a lamp base having an electrically conductive first region connected electrically to said wire support frame and an electrically conductive second region insulated from said first region, said first region being attached to said neck portion of said outer envelope and said second region having an aperture therethrough, said electrically conductive end portion of said elongated member extending through said aperture; and
a spring means engaging said elongated member for urging said opposite end portion of said elongated member into engagement with an inner wall of said opposite dome portion of said outer envelope and for urging said electrically conductive end portion out of said aperture if said outer envelope is broken.

2. An electric lamp as described in claim 1 wherein said elongated member comprises an outer glass tube and a concentric inner metal rod, a length of said inner metal rod extending in an axial direction out of said outer glass tube, said length of said inner metal rod forming said electrically conductive end portion and said outer glass tube forming said opposite end portion.

3. An electric lamp as described in claim 2 wherein said spring means is a helical spring which is concentric about said length of said inner metal rod, said helical spring being compressed between said elongated member and said lamp base to urge said outer glass tube against said inner wall.

4. An electric lamp as described in claim 3 wherein said outer glass tube provides a shoulder where said length of said inner metal rod extends out of said outer glass tube, and further wherein said helical spring has a first spring end which abuts said shoulder and an opposite spring end which abuts said lamp base.

5. An electric lamp as described in claim 4 wherein said first region of said lamp base comprises a threaded metal shell and said second region of said lamp base comprises a metal eyelet, and further including an insulator positioned between said threaded metal shell and said metal eyelet, said aperture extending through said insulator and said eyelet and said opposite spring end abutting said insulator.

6. An electric lamp as described in claim 5 wherein said sealed inner envelope means is a tungsten-halogen capsule.

7. An electric lamp as described in claim 1 wherein said electrically conductive end portion is electrically connected to said second region of said lamp base.

8. An electric lamp as described in claim 1 wherein said one end of said wire support frame is interposed relative &o said neck portion of said outer envelope and said first region of said lamp base and is attached to said neck portion of said outer envelope.

9. An electric lamp as described in claim 4 wherein said first diode lead is electrically connected and mechanically connected to said length of said inner metal rod adjacent said shoulder.

10. An electric lamp as described in claim 2 wherein said concentric inner metal rod is nickel.

11. An electric lamp as described in claim 1 wherein said first diode lead is welded to said electrically conductive end portion and said second diode lead is welded to said second inner envelope lead.

12. An electric lamp as described in claim 1 wherein said sealed inner envelope means is a tungsten-halogen capsule.

13. A tungsten-halogen lamp, comprising:
- a sealed tungsten-halogen capsule having a first capsule lead, and a second capsule lead, extending therefrom;
- a wire support frame having a first leg and a second leg, said first capsule lead being electrically connected to said first leg and said second capsule lead being spaced from said wire support frame;
- an elongated member comprising an outer glass tube, and a concentric inner metal rod, a length of said inner metal rod extending in an axial direction out of said outer glass tube, said outer glass tube forming a first end of said elongated member and said length of said inner metal rod forming an opposite second end of said elongated member, said outer glass tube forming a shoulder where said length of said inner metal rod extends out of said outer glass tube;
- a diode having a first diode lead electrically connected and mechanically connected to said second end of said elongated member adjacent said shoulder and a second diode lead electrically connected to said second capsule lead;
- a light-transmissive outer envelope forming a cavity therein and having neck portion and an opposite dome portion, said first leg and said second leg each having a respective end segment attached to said neck portion and an opposite end segment extending into said cavity to support said sealed tungsten-halogen capsule within said cavity;
- a lamp base comprising a threaded metal shell, a metal eyelet, and an insulator therebetween, said metal eyelet and said insulator having an aperture extending therethrough, said threaded metal shell being attached to said neck portion, and said first leg and said second leg being interposed relative to said neck portion and said threaded metal shell and being electrically connected to said threaded metal shell, a segment of said length of said inner metal rod extending through said aperture; and
- a helical spring which is concentric about a portion of said length of said inner metal rod, said helical spring having a first spring end which abuts said first diode lead and an opposite second spring end which abuts said insulator, said helical spring being compressed between said first diode lead and said insulator and urging said outer glass tube into engagement with an inner wall of said dome portion.

14. A tungsten-halogen lamp as described in claim 13 wherein said concentric inner metal rod is nickel.

15. An electric lamp, comprising:
- an outer envelope forming a cavity therein and having a first portion to which is a lamp base and an opposite second portion, said lamp base having an aperture extending therethrough;
- an elongated member having an electrically conductive end portion and an opposite end portion, said electrically conductive end portion extending through said aperture;
- light means positioned within said outer envelope for converting electrical energy into light, said light means being electrically connected to said lamp base and to said electrically conductive end portion; and
- a spring means engaging said elongated member for urging said opposite end portion into engagement with an inner wall of said opposite second portion and for urging said electrically conductive end portion out of said aperture if said outer envelope is broken.

16. An electric lamp as described in claim 15 wherein said elongated member comprises (a) an outer glass tube which forms said opposite end portion and (b) a concentric inner metal rod a length of which extends in an axial direction out of said outer glass tube to form said electrically conductive end portion.

17. An electric lamp as described in claim 16 wherein said spring means is a helical spring which is concentric about said length of said concentric inner metal rod, said helical spring being compressed between said elongated member and said lamp base to urge said outer glass tube against said inner wall.

18. An electric lamp as described in claim 17 wherein said outer glass tube provides a shoulder where said length of said inner metal rod extends out of said outer glass tube, and further wherein said helical spring has a first spring end which abuts said shoulder and an opposite spring end which abuts said lamp base.

19. An electric lamp as described in claim 18 wherein said lamp base comprises a threaded metal shell, a metal eyelet and an insulator positioned between said threaded metal shell and said metal eyelet, said aperture extending through said insulator and said eyelet, and said opposite spring end abutting said insulator.

20. An electric lamp as described in claim 19 wherein said light means is a tungsten-halogen capsule.

* * * * *